United States Patent [19]
Screen

[11] 3,914,821
[45] Oct. 28, 1975

[54] CASTORS
[75] Inventor: Stafford Thomas Screen, Stourbridge, England
[73] Assignee: British Castors Limited, Stafford, England
[22] Filed: July 19, 1974
[21] Appl. No.: 490,048

[52] U.S. Cl. ............................................. 16/35 R
[51] Int. Cl.² ........................................ B60B 33/00
[58] Field of Search .......... 16/35 R, 35 D, 18 R, 19, 16/20, 37, 39, 31 R, 31 A, 40

[56] References Cited
UNITED STATES PATENTS

| | | | |
|---|---|---|---|
| 2,660,265 | 11/1953 | Middendorf | 16/35 R X |
| 2,905,275 | 9/1959 | Kostelecki et al. | 16/35 R X |
| 3,238,558 | 3/1966 | Greene | 16/35 R |

FOREIGN PATENTS OR APPLICATIONS
572,044   11/1931   Germany............................ 16/35 R

*Primary Examiner*—Geo. V. Larkin
*Attorney, Agent, or Firm*—Friedman & Goodman, Esq.

[57] ABSTRACT

A castor comprising a body, a cup-shaped roller journalled on the body, and means enabling the castor to be mounted on an article of furniture. The castor is provided with braking means to lock the roller relative to the body: in its operative position, a brake shoe of the braking means engages an inner surface of the roller to prevent rotation thereof. The braking means is highly effective, and detracts minimally from the aesthetic appeal of the castor.

7 Claims, 5 Drawing Figures

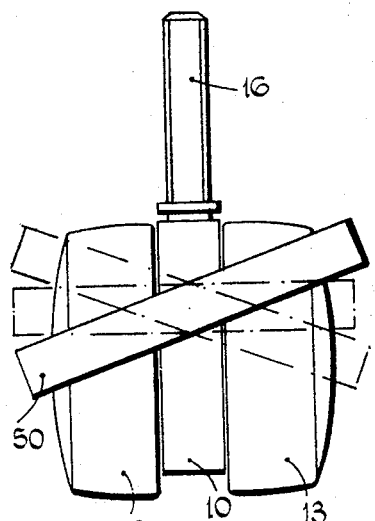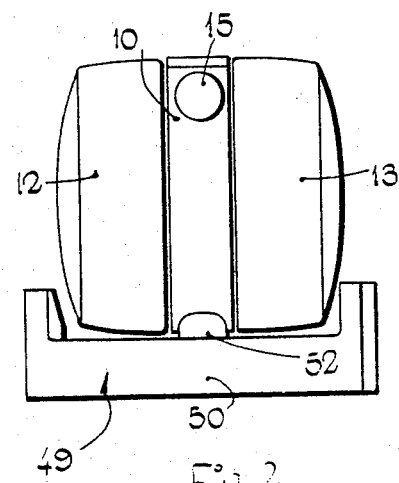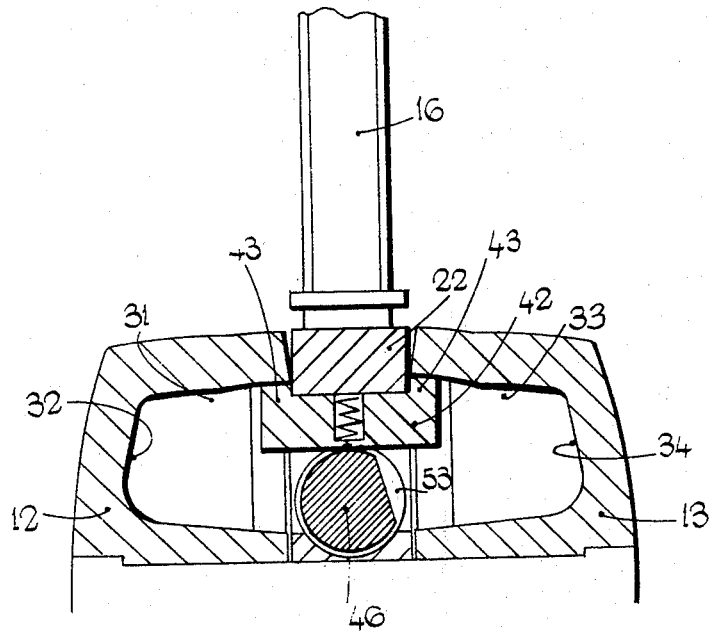

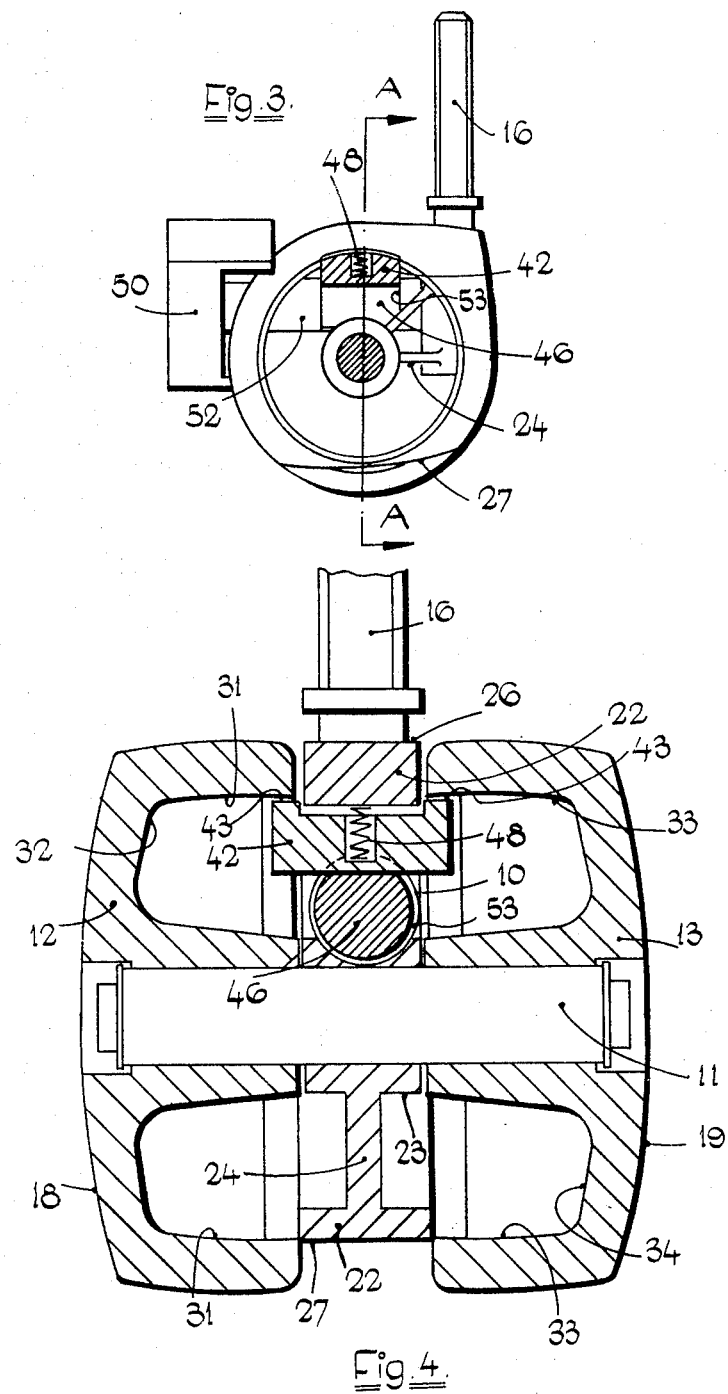

CASTORS

BACKGROUND OF THE INVENTION

1. Field of the Invention

This invention is concerned with inprovements in or relating to braked castors of the kind which may be fitted to articles of domestic or office furniture to allow such articles to be moved from one desired position to another.

It is desirable that castors be provided with braking means whereby an article of furniture to which they are fitted may be restrained against movement from a desired position, such braking means being capable of being readily rendered inoperative to allow the article of furniture to be moved to another desired position.

It will, however, be readily appreciated that it is necessary that the braking means is fully effective to prevent rotation of a roller relative to the body under conditions normally encountered in use. Furthermore such braking means should be readily accessible, to facilitate unlocking and relocking, and should detract minimally from the aesthetic appeal of the castor.

2. Description of the Prior Art

A known castor comprises a castor horn and a spindle extending between opposed arms of the horn and which mounts a roller. A central arm of the castor horn is provided with means enabling the horn to be secured to an article of furniture. The castor additionally comprises braking means movable from an inoperative to an operative position to restrain the roller against rotation on the spindle, said braking means comprising a cam plate mounted on the spindle and interposed between an exterior face of one of the side arms of the horn and an end cap of the spindle, and means extending from the cam plate to facilitate rotation thereof. In the use of the braking means, the cam plate is rotated, causing the two side arms of the horn to be squeezed together against axially-extending bosses of the roller.

Such a castor suffers from a disadvantage in that effective locking of the roller is difficult to achieve without impairing the aesthetic appeal of the castor, since unless the axially-extending bosses are of large diameter, the areas of engagement between the side arms of the horn and said radially-extending surface portions of the bosses are confined to surface portions close to the axis of the spindle.

A further disadvantage of such a castor is that, after prolonged use, the horn tends to develop a "set" in which, even with the braking means inoperative, the side arms of the horn tend to restrict rotation of the roller.

Further, a particularly desirable castor comprises a body, which comprises mounting means (either in the form of a socket adapted to receive the spindle secured to an article of furniture, or provided by a spindle extending rigidly from the body, and adapted to be received with a socket provided in the article of furniture) whereby the castor may be secured to such article of furniture in a manner such that the castor is capable of swivelling movement, and a cup-shaped roller comprising outer surfaces, including a floor-engaging surface, and inner surfaces. Such a castor is described in detail in United Kingdom Patent Specification No. 1,219,102. The provision of such a castor with braking means using known methods is difficult to achieve without seriously impairing the aesthetic appeal of the castor, and it is one of the various objects of this invention to provide such a castor with braking means which is both effective and which detracts minimally from the aesthetic appeal of the castor.

SUMMARY OF THE INVENTION.

This object is achieved, in a castor of the kind set out in the last preceding paragraph, by the improvements wherein braking means is mounted on the body and which is movable between an inoperative position in which the roller may rotate relative to the body and an operative position in which said braking means engages one of the inner surfaces of the roller to restrain the roller against rotation relative to the body.

Advantageously, the braking means comprises a brake shoe, and an operating member providing a cam surface, the brake shoe being spring-urged towards said cam surface, and the operating member being mounted for rotation about an axis from an "off" position to an "on" position whereby the cam surface is moved to urge the brake shoe against one of the inner surfaces of the roller to effect locking of the roller. Preferably, when the braking means is in its operative position, movement thereof to its inoperative position is restrained, conveniently by arranging the cam surface in a manner such that forces acting thereupon do not act to effect movement of the operating member towards its "off" position, for example, by ensuring that, when the braking means is in its operative position, the cam surface is in an over-centre position.

Conveniently the brake shoe is arranged to engage an inner, circumferential surface of the roller since the operative surfaces are in this way located at a maximum distance from the axis of the roller, such engagement need be over only a relatively small portion of the circumference thereof.

Preferably the castor comprises two cup-shaped rollers, the body being centrally located between said rollers with open sides of the rollers being inwardly directed towards the body, said braking means when in its operative position engaging inner, circumferential surfaces of both rollers.

Preferably the or each roller is of plastics material, and movement of the braking means to its operative position causes said or each roller to be marginally deformed.

A preferred embodiment of the invention will now be described with reference to the accompanying drawings.

BRIEF DESCRIPTION OF THE DRAWING.

FIG. 1 is a front elevation of a castor in accordance with the present invention, an operating member thereof being shown in an "on" position in full lines with an alternative "on" position, and an "off" position, being shown in broken lines;

FIG. 2 is a plan view of the castor shown in FIG. 1;

FIG. 3 is an end elevation of the castor, one of the rollers thereof having been removed, and the operating member being shown in its "on" position;

FIG. 4 is a sectional view taken on the line A—A of FIG. 3, but with the braking means in its inoperative position; and FIG. 5 is an enlarged view similar to part of that shown in FIG. 4 but with the braking means in its operative position.

DESCRIPTION OF THE PREFERRED EMBODIMENT

The castor illustrated is intended to be used on articles of furniture and comprises a body 10 having a central opening through which extends an axle 11 on which are journalled rollers 12 and 13, which rollers are cup-shaped, open sides of the rollers being directed towards the body 10, and have peripheral outer surfaces 18 and 19 respectively, including a floor-engaging surface, and inner surfaces comprising circumferential surfaces 31 an 33, respectively, and radially-extending surfaces 32 and 34 respectively. The body is formed with a vertical socket 15 to receive the spindle 16 of an article of furniture.

The body 10 is formed as a generally disc-like member, comprising a rim 22, and a hub 23, and struts 24 extending between the rim and the hub. An outer surface 26 of the rim 22 is substantially flush with the surfaces 18 and 19 of the wheels adjacent to the inner axial boundaries thereof over the major portion of the circumference of the wheels. At its underside however the surface 26 includes a downwardly presented surface portion 27 which is spaced above the lowest parts of the peripheral surfaces 18, 19 of the rollers.

Extending downwardly from an upper portion of the rim 22 of the body 10 is a spigot (not shown). The castor comprises braking means comprising a brake shoe 42 of generally rectangular U-shaped cross-section, upper, wear surfaces 43 of the arms of the shoe having a curvature equal to that of the inner circumferential surfaces 31 and 33 of the rollers 12 and 13.

The braking means also comprises an operating member 49 comprising a manually accessible bar 50, and a shaft 52 extending from the bar 50 through a bore 54 extending through the rim 22 of the body and one of the struts 24. A circumferential portion of the shaft 52 adjacent the brake shoe 42 is reduced, whereby the shaft 52 provides a cam member 46 located between the brake shoe 42 and the hub 23 and providing a cam surface of D-shape in cross-section extending generally tangentially to the hub 23. A spring 48 located on the spigot acts against the shoe 42 and urges said shoe against the cam surface.

In the inoperative position of the braking means, the bar 50 of the operating member extends generally horizontally, that is generally parallel to the axis about which the rollers 12 and 13 are journalled on the axle 11. By depression of either end portion (FIG. 2) of the bar 50, the shaft 52 may be rotated about its longitudinal axis to move the cam member from the position in which it is shown in FIG. 4 to the position in which it is shown in FIG. 5, urging the brake shoe 42 against the inner, circumferential surfaces 31, 33 of the rollers 12, 13 to effect locking of the castor. The construction and arrangement of the braking means is such that, when the operating member is in its "on" position, the cam member is in an over-centre position, that is, forces acting upon the cam member do not act thereupon in a manner such as to tend to cause rotation of the shaft 52 to return the bar 50 to its horizontal position. Thus, when the braking means is in its operative position, movement thereof towards its inoperative position is restrained: however, by depression of the bar 50 at the opposite side, the shaft 52 may be rotated to return the bar 50 to its horizontal position, thereby returning the operating member to its "off" position and the braking means to its inoperative position.

Many of the parts of the castor are moulded of plastics material, specifically the rollers 12 and 13. The arrangement of the brake 42 and the cam member 46 is such that, when the braking means is in its operative position, a slight deformation of the circumferential walls of the rollers 12 and 13, specifically in the region of the brake shoe 42, is caused (see FIG. 5). In this manner, a very effective locking of the rollers 12 and 13 against rotation relative to the body is produced.

In the provision of the cam member 46, the shoe 42 is reduced around the entire circumference, providing, between the cam member 46 and the portion of the shaft 52 remote from the bar 50, a shoulder 53. Since the shoe 42 is urged into engagement with the surface of the cam member, the provision of such shoulder constitutes means, irrespective of the position of the braking means, to prevent the shaft from being withdrawn from the body without diassemblement of the castor.

The positioning of the operating member is such that, when the castor is fitted onto an article of furniture, it may be conveniently manipulated by the use of a foot.

I claim:

1. In a castor comprising a body, the body comprising mounting means whereby the body may be secured to an article of furniture in a manner such that the castor is capable of swivelling movement relative to the article of furniture, a cup-shaped roller comprising outer surfaces including a floor-engaging surface and inner surfaces and being journalled for rotation on the body, the improvement wherein the roller is of a resiliently-deformable plastics material, and braking means mounted on the body is movable between an inoperative position in which the roller may rotate relative to the body and an operative position in which it engages one of the inner surfaces of the roller and resiliently deforms said surface outwardly of the roller to secure the roller against rotation relative to the body.

2. A castor according to claim 1 wherein said braking means comprises a brake shoe, and an operating member providing a cam member, the brake shoe being spring-urged towards said cam member, and wherein by manipulation of the operating member the cam member may be moved to urge the brake shoe against one of the inner surfaces of the roller.

3. A castor according to claim 2 wherein manipulation of the operating member involves rotation thereof about an axis.

4. A castor according to claim 3 wherein on movement of the braking means to its operative position said brake shoe engages an inner, circumferential surface of the roller and deforms said surface at the point of engagement radially outwardly of the roller.

5. A castor according to claim 1 wherein two cup-shaped rollers are provided, the body being mounted centrally between said rollers with open sides of the rollers being inwardly directed towards the body, said braking means when in its operative position engaging inner, circumferential surfaces of both rollers.

6. A castor according to claim 1 comprising means to restrain the operating member against withdrawing movement from the body, irrespective of the position of said braking means.

7. A castor according to claim 1 wherein movement of the braking means to its operative position involves rotation of a cam member of the braking means, mounted on the body, to an over-centre position whereby movement of the braking means from its operative position is restrained.

* * * * *